Aug. 15, 1950  R. S. TRAVIS  2,518,648
BALL AND SOCKET TYPE OAR LOCK
Filed Dec. 20, 1946  2 Sheets-Sheet 1
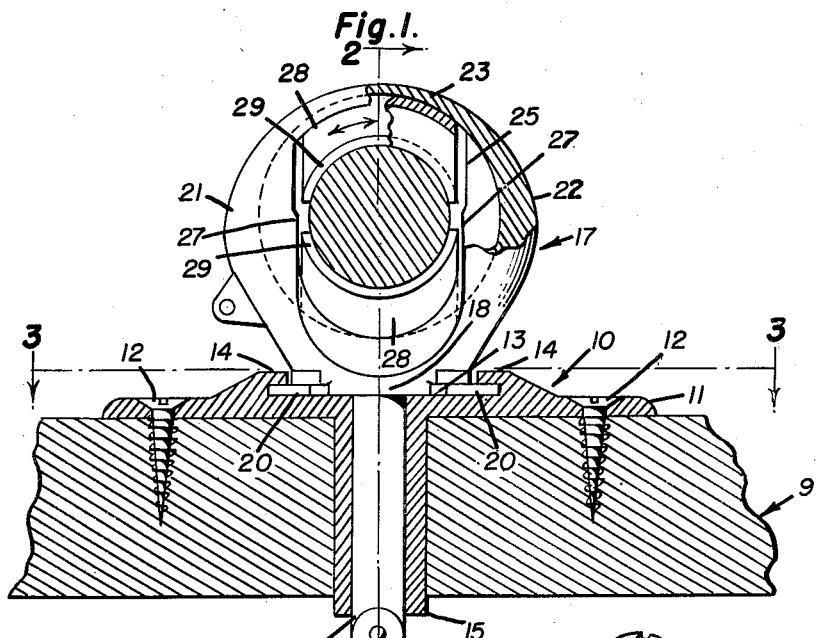
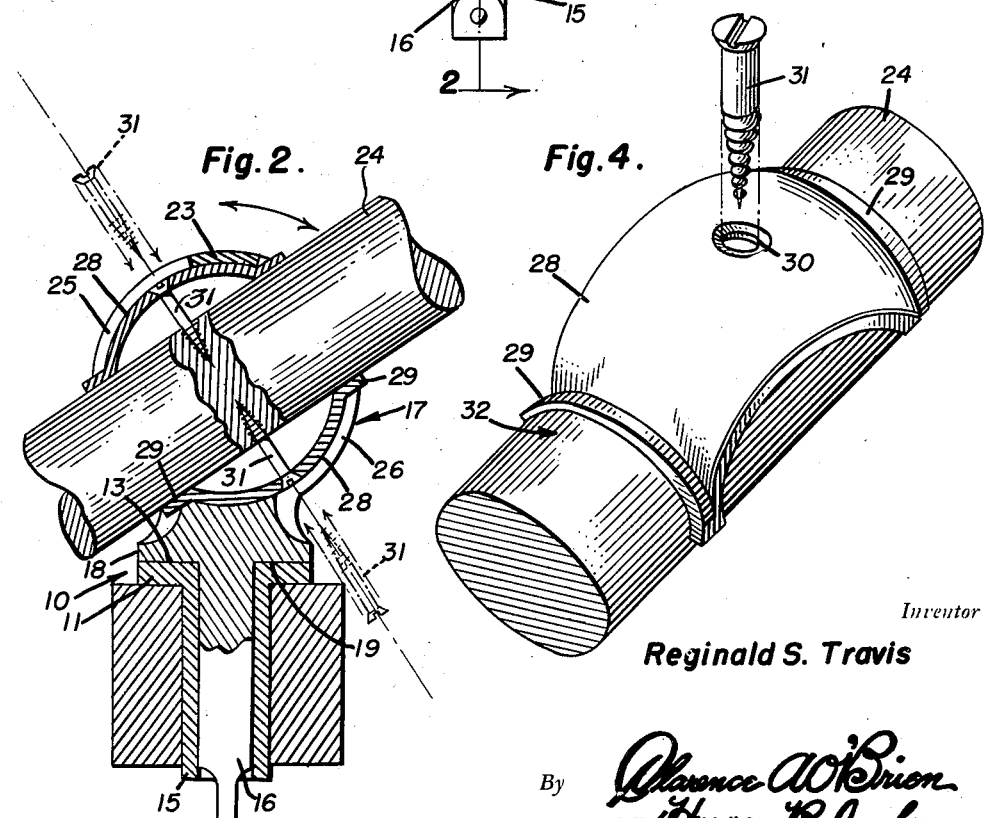
Inventor
Reginald S. Travis
By *Clarence A. O'Brien and Harvey B. Jacobson*
Attorneys Aug. 15, 1950   R. S. TRAVIS   2,518,648
BALL AND SOCKET TYPE OAR LOCK
Filed Dec. 20, 1946   2 Sheets-Sheet 2
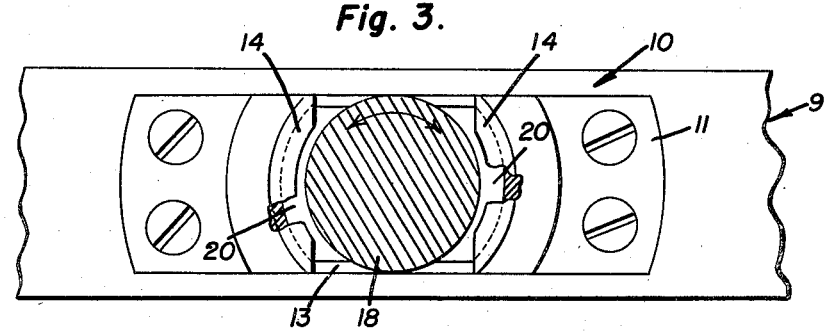
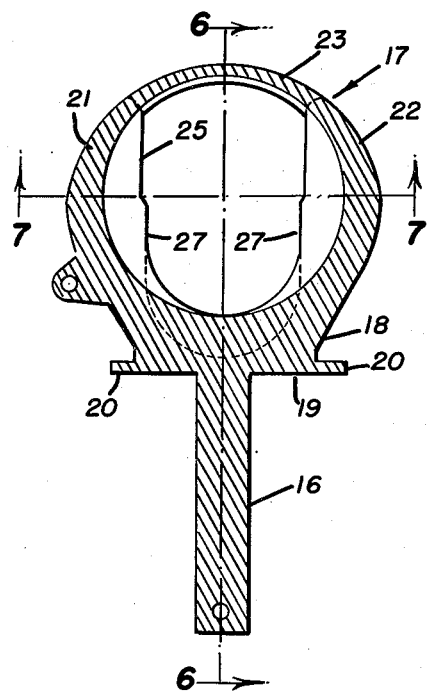
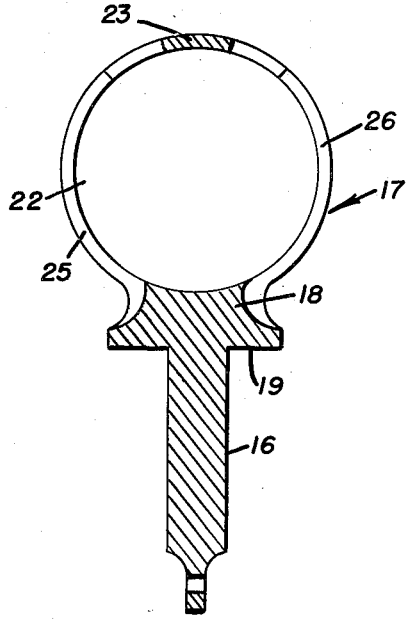
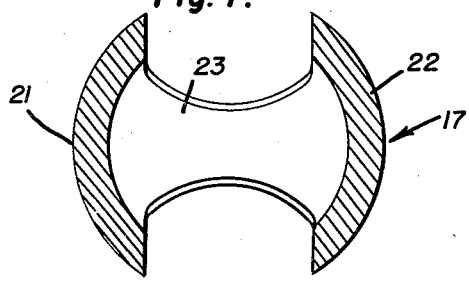
Inventor
Reginald S. Travis
By *Clarence A. O'Brien and Harvey B. Jacobson*
Attorneys Patented Aug. 15, 1950

2,518,648

UNITED STATES PATENT OFFICE 2,518,648

BALL-AND-SOCKET TYPE OARLOCK

Reginald S. Travis, Olympia, Wash.

Application December 20, 1946, Serial No. 717,573

4 Claims. (Cl. 9—26)

This invention relates to certain new and useful improvements in oar locks and has reference in particular to novel ball and socket means such as provides for a free operating connection between one of a pair of oars and customary gunwales of a row boat or the like.

More explicitly, the invention has to do with structural and functional improvements based on a similar oar lock disclosed in Patent 1,627,128 granted to me under date of May 3, 1927.

Briefly, the prior patent noted comprises a sectional bushing, the complemental sections of which are fastened on the oar shaft to provide ball-like jointing means, and the latter is seated and mounted in an oar lock construction characterized by socket-like mount having part-spherical portions or arms spaced apart in such a way as to allow the bushing equipped oar shaft to be inserted and removed.

In carrying out the improvements of the instant invention a structurally different socket is used, the same embodying a web which connects said arms, this in such a manner as to define a substantially spherical socket with diametrically opposite slots, whereby to wholly embrace sectional bushing means of the shaft and to retain the parts assembled; permitting, at the same time, the universal jointing result wanted.

Another object of the invention is to employ hollow shell-type bushing sections, these being applicable to the oar shaft by way of the aforesaid slots and after said shaft has been inserted endwise and passed through said slots, whereby to facilitate assembling and repairing while, at the same time, maintaining a proper jointing connection between said shaft, bushing means and the enclosing socket.

A further object of the invention is to provide a boat oar mount and lock wherein all necessary movements of the oars may be adequately and satisfactorily attained, the structural means employed in achieving such ends being strong and reliable yet comparatively simple and effective from point of view of manufacturers and users alike.

Other objects, features and advantages of the invention will become more readily apparent from the accompanying sheets of illustrative drawings.

In the drawings wherein like numerals are employed to designate like parts throughout the various views:

Figure 1 is a fragmentary illustration of certain old parts, in conjunction with an improved ball and socket type oar lock constructed in accordance with the invention, the latter being drawn partly in section and partly in elevation.

Figure 2 is a central vertical sectional view taken approximately on the plane of the line 2—2 of Figure 1, looking in the direction of the arrows.

Figure 3 is a horizontal section on the line 3—3 of Figure 1, looking in the direction of the arrows.

Figure 4 is a fragmentary perspective view showing a portion of an oar shaft and one of the improved bushing sections about ready to be attached thereto.

Figure 5 is a central vertical sectional view through the socket unit, per se.

Figure 6 is a central vertical section on the line 6—6 of Figure 5, looking in the direction of the arrows.

Figure 7 is a horizontal section on the line 7—7 of Figure 5, looking in the direction of the arrows.

Referring now to the drawings and particularly to Figures 1, 2 and 3, the boat, or gunwale thereof, is denoted by the reference numeral 9. Attached to this is an oar lock foundation and anchoring fixture, the latter denoted, unitarily speaking, by the numeral 10. Said fixture comprises an elongated mound portion including a flat surfaced foundation 13 provided with transverse longitudinally spaced assembling flanges 14. Also forming a part of said fixture is a central depending tubular bearing 15, the latter serving to accommodate the oar lock stud or pin 16. Said pin 16 is an integral part of the substantially spherical socket unit 17 and depends from the basal portion 18 of said unit. Said basal portion is of enlarged head-like form in respect to the pin and has a flat bottomed surface 19 which rests nicely and properly on the co-acting top surface 13 of said mound. In addition said basal portion 18 includes outstanding marginal flanges of segmental form which fit under arcuate flanges 14 and are thus keyed in place. The flanges on said basal portion are denoted by the numerals 20. This arrangement serves to key the spherical socket to the fixture, to stabilize the relative arrangement and to permit the desired oscillation of said socket in relation to the fixture and boat gunwale. Considering now the construction of the body portion of the socket it will be noted the same is substantially spherical in general shape and form, the lower portion thereof merging properly into the pin equipped basal portion 18. More particularly said body portion includes opposed part-spherical sides 21 and 22, these being bridged and connected together by a top web 23. The inner surfaces of the parts 21 to 23 are of such curvatures as to provide the desired spheroidal adaptation surfaces for the bushing means on the oar shaft 24. It will be noted too, that the formation of parts 21 to 23 is such as to define diametrically opposite slots 25 and 26 which slots serve to accommodate protruding end portions of the oar shaft and accommodate both axial and bodily rocking movements thereof. I might add at this point that the lower-half portions of the respective slots are provided with space narrowing flanges 27 (see Figs. 1 and 5) which serve to maintain the parts in properly assembled relationship.

As before mentioned the bushing, which is carried by the oar shaft, is of sectional construction, the companion sections being duplicates, one of the other. Each section is fashioned from a plate whose major portion is of elongated concavo-convex form this to provide a shell-like part. More specifically, the concavo-convex formation provides a part-spherical bulge which defines a so-called ball jointing element 28. Each section also has arcuate end flanges 29 (see Fig. 4 in particular), these flanges conforming in curvature to the correspondingly shaped surfaces of the oar shaft. Then, too, each section has a screw-hole 30 with a countersunk marginal portion serving to provide ways and means to accommodate the attaching wood-type screw 31.

The fact that the spherical body of the oar lock proper is substantially closed, except for the diametrically opposed entrance and oar accommodation slots, it is obvious that once the parts are assembled, as shown in Figures 1 and 2, the association of same is then substantially permanent. In connection with the previous patented construction it was found that the bodily insertable and removable idea which was designed to facilitate attaching and detaching of the oar in relation to the oar lock proved out to be undesirable due to dislocation and accidental displacement of the oar in respect to its lock. With the improved adaptation herein disclosed, the more permanent relationship of parts has proved to be more satisfactory and desirable.

And due to the construction under advisement, the step of assembling the oar in the socket necessitates placing the shaft endwise and passing it through and beyond the respective slots. Then, the shell-like bushing sections, denoted generally by the reference numerals 28 are placed in position and screwed into place as shown in dotted and full lines in Figure 2. Screw holes 30 are lined up with the slots in the spherical body, making this assembling and fastening of parts practical.

Although a special fixture 10 is shown as a foundational base to expedite adequate assembling of the spherical socket on the boat, said fixture and the mechanical association of the socket therewith is not claimed.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having disclosed the invention, what is claimed is:

1. As a new article of manufacture and as a component part of an oar lock construction of the class described, a base member having a depending anchoring and turning pin, and a body attached to and rising from said base member, said body being one-piece and of hollow form and defining a chamber, the walls of said chamber being substantially spherical and said body having vertically disposed diametrically opposite slots to accommodate co-acting portions of the shaft of a rowing oar, an oar including a shaft having a portion situated in said chamber and end portions extending through and beyond said slots, and shaft jointing and means operably mounted within the confines of said chamber and including complemental members detachably mounted on said shaft and accessible for removal and application by way of said slots.

2. The structure specified in claim 1, said members being a pair of complemental diametrically opposite duplicate half-sections, said half-sections being part-spherical in form.

3. The structure specified in claim 1, said members being a pair of complemental diametrically opposite duplicate half-sections, said half-sections being part-spherical in form, and each half-section being of hollow shell-like form and including a screw accommodation hole centrally located to facilitate the steps of assembling and disassembling.

4. In a ball and socket joint construction of the class described, a one-piece spherical socket provided with diametrically opposite slots, a shaft having a portion within the confines of said socket and end portions projecting through and beyond the slots, a pair of duplicate diametrically opposite hollow part-spherical assembling and jointing members attached removably to diametrically opposite sides of said shaft member and operable within the confines of said socket and secured in place by readily available screws, the screws being accessible through said slots for assembling and disassembling purposes.

REGINALD S. TRAVIS.

REFERENCES CITED

The following references are of record in the file of this patent:

UNITED STATES PATENTS

| Number | Name | Date |
|---|---|---|
| 44,373 | Norcross | Sept. 20, 1864 |
| 173,560 | Roseti | Feb. 15, 1876 |
| 186,005 | Graves | Jan. 9, 1877 |
| 998,562 | Young | July 18, 1911 |